W. H. THORNTON.
PORTABLE FISHING CASE.
APPLICATION FILED AUG. 6, 1908.
908,903.
Patented Jan. 5, 1909.
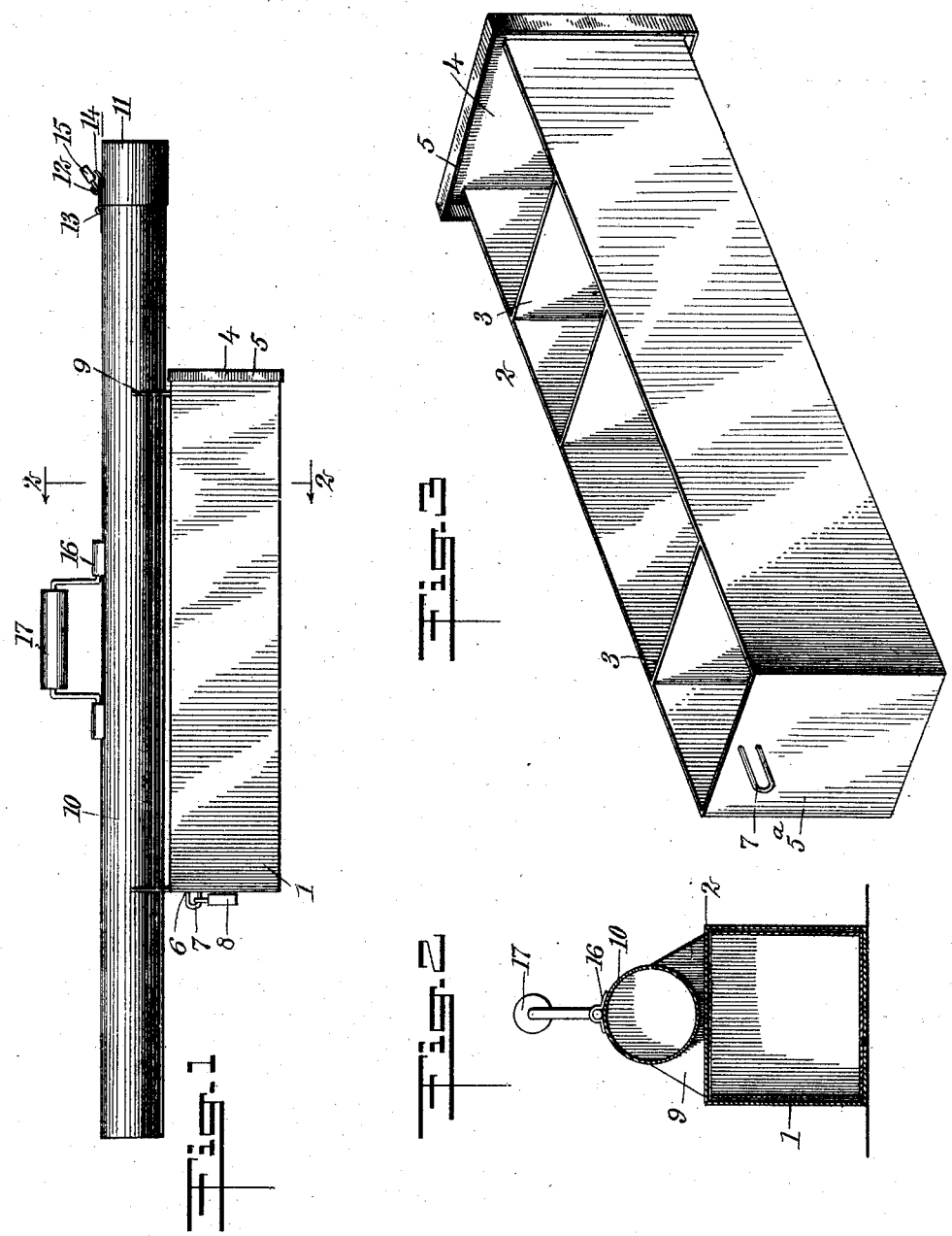
WITNESSES
INVENTOR
William H. Thornton
BY
ATTORNEYS

UNITED STATES PATENT OFFICE.

WILLIAM HENRY THORNTON, OF CROSSETT, ARKANSAS, ASSIGNOR OF ONE-HALF TO JOHN W. CULLEY, OF GLASS, MISSISSIPPI.

PORTABLE FISHING-CASE.

No. 908,903.   Specification of Letters Patent.   Patented Jan. 5, 1909.

Application filed August 6, 1908. Serial No. 447,245.

*To all whom it may concern:*

Be it known that I, WILLIAM H. THORNTON, a citizen of the United States, and a resident of Crossett, in the county of Ashley and State of Arkansas, have invented a new and Improved Portable Fishing-Case, of which the following is a full, clear, and exact description.

My invention relates to fishing cases, and more particularly such as are each provided with a receptacle for carrying such tackle as reels, hooks, leaders or the like, and a cylindrical case mounted thereon and adapted to receive the several sections of a jointed fishing rod.

The object of the invention is to provide a device of the class described, simple and efficient in construction and inexpensive to manufacture, which is constructed of some suitable material, such as sheet metal or the like, means whereby both the tackle receptacle and the rod case can be securely locked so that the danger of some unauthorized person opening either is obviated, and which can be conveniently carried.

Reference is to be had to the accompanying drawings forming a part of this specification, in which similar characters of reference indicate corresponding parts in all the views.

Figure 1 is a side elevation showing an embodiment of my invention; Fig. 2 is an enlarged cross section on the line 2—2 of Fig. 1; and Fig. 3 is an enlarged perspective view of the tray of the tackle receptacle.

In the specific form shown in the drawings, I provide a receptacle 1 of any suitable material, such as sheet metal or the like, which is preferably rectangular in form, and which has one end open. Adapted to be slidably arranged within the receptacle 1 is a tray 2 having a plurality of compartments 3. The end 4 of the tray extends beyond the sides, the top and bottom thereof and has a rearwardly disposed flange 5. As shown most clearly in Fig. 1, this end of the tray engages the edges of the open end of the receptacle 1, the flange 5 serving to make a tight joint with the sides of the receptacle. The closed end of the latter has an opening therethrough, which is adapted to receive a U-shaped keeper 7, which is rigidly secured to the end 5ᵃ of the tray. The keeper, when the tray is in a closed position within the receptacle, extends out beyond the back of the latter and is adapted to receive a padlock 8 or other suitable locking mechanism.

Mounted upon the receptacle by means of supports 9 secured to the latter, is a rod case 10 of any suitable material, such as sheet metal or the like, and which is preferably cylindrical in form. One end of the rod case is open and is adapted to receive a removable cap 11 which has an eye 12 mounted thereon. Arranged on the rod case near the open end thereof is a hinged locking member 13, the end 14 of which is slotted and is adapted to fit over the eye 12 of the cap, so that if a padlock 15 be applied as shown in Fig. 1, the cap will be locked firmly in position upon the end of the rod case. I further provide two brackets 16 which mount a handle 17 for carrying the device.

It should further be understood that I do not limit myself to the particular construction shown in the drawings, as others equally advantageous may be used without departing from the spirit or the scope of the invention.

Having thus described my invention, I claim as new and desire to secure by Letters Patent:—

1. In a device of the class described, a receptacle adapted to have a rod case mounted thereon and having one end open, a tray slidably arranged within said receptacle and serving to close the open end thereof, said tray having a keeper at one end thereof, said receptacle further having an opening adapted to permit said keeper to project therethrough, and removable locking means adapted to be received by said keeper to secure said tray within said receptacle.

2. In a device of the class described, a receptacle adapted to have a rod case mounted thereon and having one end open, a tray adapted to be slidably arranged within said receptacle and having one end provided with a laterally extending flange adapted to engage at the open end of said receptacle, said tray having a keeper at the end remote from said flange, said receptacle further having an opening in the closed end and adapted to permit said keeper to project therethrough, and removable locking means adapted to be received by said keeper.

In testimony whereof I have signed my name to this specification in the presence of two subscribing witnesses.

WILLIAM HENRY THORNTON.

Witnesses:
 JAMES R. WOODS,
 WILLIE L. WOODS.